March 15, 1949.　　G. E. KENTIS, JR　　2,464,402
APPARATUS FOR CONTROLLING
HEAT IN ELECTRIC WELDING Filed June 29, 1944　　3 Sheets-Sheet 1

INVENTOR.
GEORGE E. KENTIS, JR
BY
Geo. B. Pitts
attorney

March 15, 1949.  G. E. KENTIS, JR  2,464,402
APPARATUS FOR CONTROLLING
HEAT IN ELECTRIC WELDING
Filed June 29, 1944  3 Sheets-Sheet 2
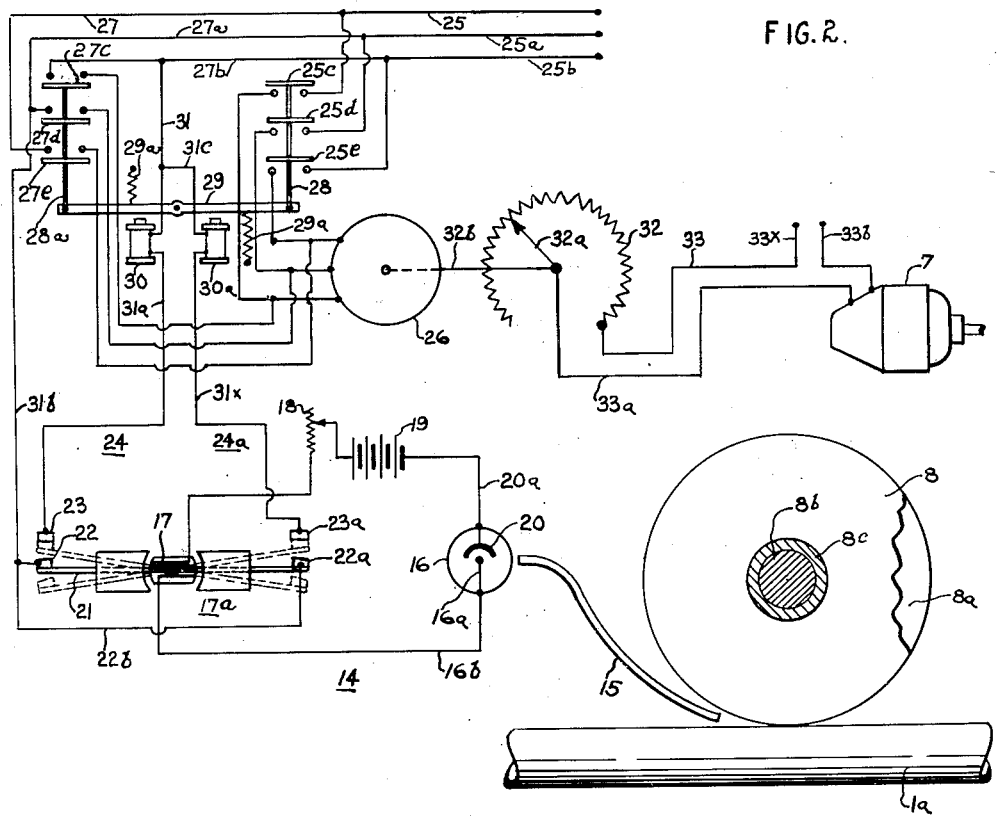
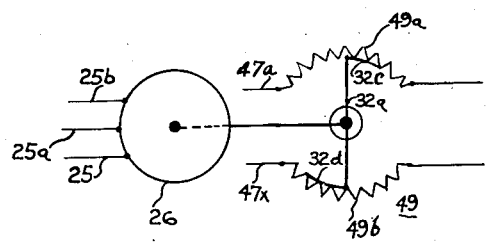
INVENTOR.
GEORGE E. KENTIS JR.
BY
Geo. B. Pitts
Attorney

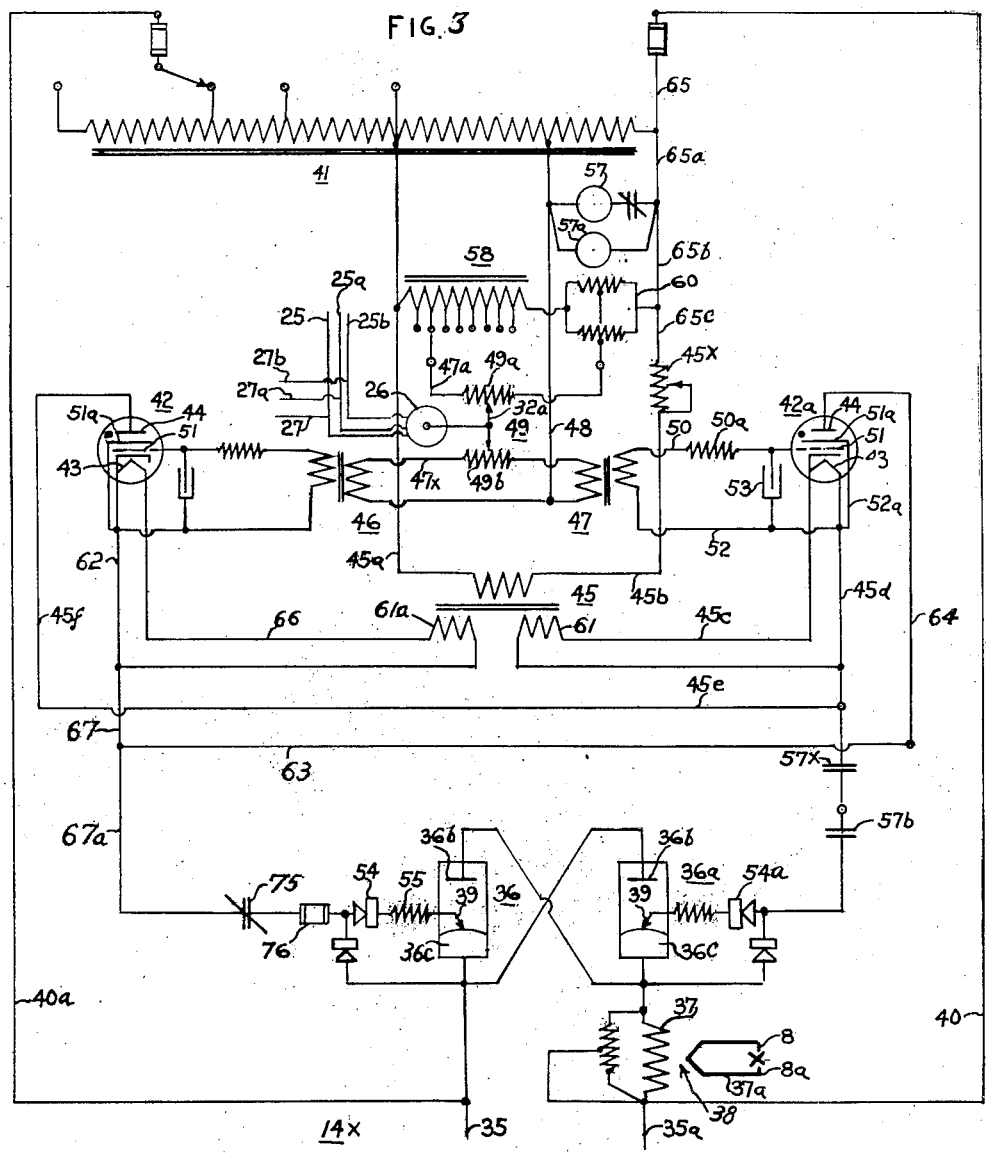

Patented Mar. 15, 1949

2,464,402

UNITED STATES PATENT OFFICE 2,464,402

APPARATUS FOR CONTROLLING HEAT IN ELECTRIC WELDING

George E. Kentis, Jr., Cleveland, Ohio, assignor to The Yoder Company, Cleveland, Ohio, a corporation of Ohio Application June 29, 1944, Serial No. 542,731

1 Claim. (Cl. 219—20)

This invention relates to apparatus for controlling heat in electric welding the longitudinal side edges of metal during relative movement of the stock. The invention is, for illustrative purposes, shown applied to or incorporated in apparatus wherein flat sheet metal is supplied to a series of shaping rolls to form the stock into hollow form with its edges related for welding and after the edges are welded the formed member is delivered to a suitable sizing and straightening mechanism and a cut-off mechanism, whereby the several steps are progressively effected without interruption to the feed of the stock and the formed member. As a result, the formation of hollow members of predetermined length is rapid and economical.

However, the invention may be advantageously employed for welding the edges of pre-formed hollow members of any desired length and/or preformed hollow members which are successively delivered in end-to-end relation to the welding mechanism and/or sections of metal which are flat or of other shape in cross section.

One object of the invention is to provide an improved welding mechanism, having means for automatically controlling the welding operation, whereby heating of the metal to effect the weld is regulated.

Another object of the invention is to provide an improved apparatus for continuously welding the side or marginal edges of metal, wherein the temperature of the fused metal is utilized to control the supply of electrical energy to effect the welding operation.

Another object of the invention is to provide an improved apparatus for welding the side or marginal edges of a preformed hollow member, wherein the color of the fused metal due to heating thereof is utilized to control the welding operation.

Another object of the invention is to provide an improved apparatus for continuously fabricating sheet metal into tubular form and electrically welding the marginal edges thereof, wherein the supply of electrical energy is automatically controlled.

Another object of the invention is to provide an improved apparatus for continuously welding the marginal edges of metal wherein the feed of the metal is controlled by the rise and fall of the temperature of the metal during welding.

A further object of the invention is to provide an improved apparatus for welding the side or marginal edges of metal in a chamber filled with a non-oxidizing or reducing atmosphere.

A further object of the invention is to provide an improved electrical process of continuously welding the marginal edges of metal and simultaneously regulating the supply of electrical energy.

A further object of the invention is to provide an improved process for continuously fabricating flat sheet metal into tubular form and welding the side edges of the form.

Other objects of the invention will be apparent to those skilled in the art to which my invention relates from the following description taken in connection with the accompanying drawings, wherein Figs. 1 and 1a taken together, illustrate in side elevation and largely diagrammatically apparatus embodying my invention and capable of carrying out the herein disclosed process;

Fig. 2 is a diagram showing one form of the electrical means for controlling the welding operation;

Fig. 3 is a diagram showing a modified arrangement of electrical means wherein the supply of electrical energy to the electrodes is controlled;

Fig. 4 is a fragmentary diagrammatic view of parts shown in Fig. 3, enlarged.

Figures 1, 1A, 1B:
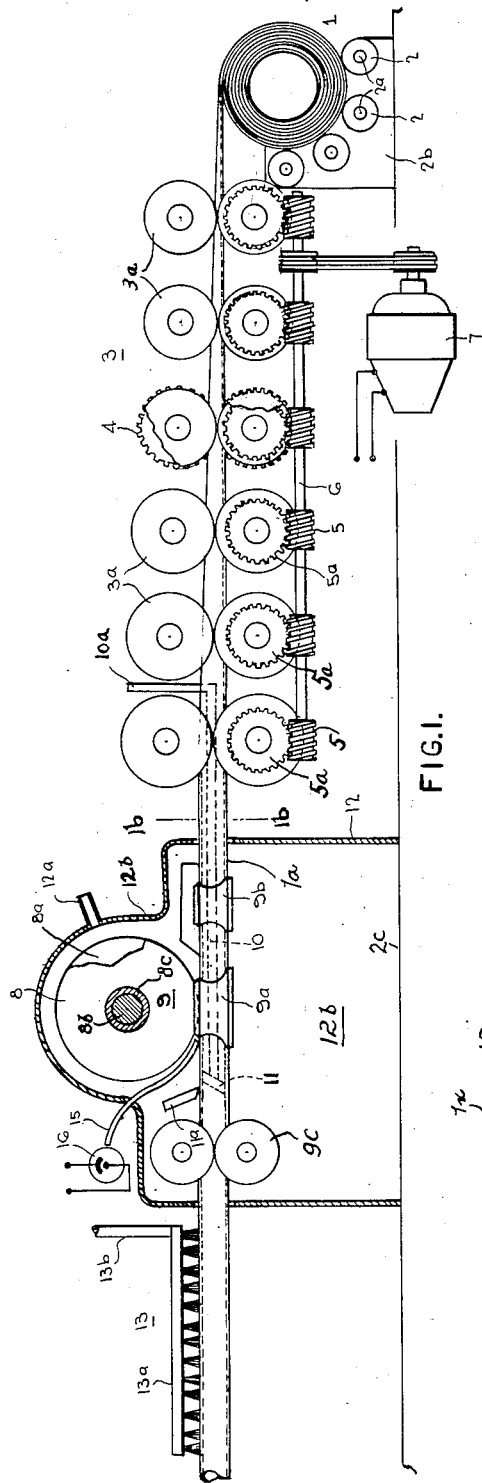
Fig. 1b is a section on the line 1b—1b of Fig. 1.

In the drawings, 1 indicates as an entirety a source of supply for sheet metal, consisting of coiled sheet metal stock having a ferrous base as supplied from a mill. From illustrative purposes, the coil 1 is mounted on rolls 2 which are free to turn on shafts 2a suitably mounted in a support 2b, whereby the flat stock may be uncoiled and supplied to a suitable shaping mechanism, indicated as an entirety at 3. The coil 1 may be otherwise supported, for example, in the manner shown in Letters Patent No. 2,139,873 or 2,179,461 to Carl M. Yoder. The shaping mechanism 3 consists of a plurality of sets of rolls 3a to and through which the material passes, the sets of rolls being driven and serving to progressively shape the sheet metal into a hollow member—preferably of tubular shape in cross section, as shown at 1a in Fig. 1b. I have shown six sets of rolls 3a, but the number of sets of rolls employed will depend upon the thickness and width of the sheet metal stock and diameter of the formed member, as well as the character of the metal. The rolls of each set may be mounted in any desired manner in housings or standards, such as shown in Letters Patent Nos. 2,001,757 or 2,098,989 to Carl M. Yoder. At one side the shafts for each set of rolls are provided with gears 4 in meshing relation (gears 4 for one set of rolls only being shown).

whereby they are drivingly connected and one shaft (preferably the lower shaft) is provided with a worm 5 in mesh with a worm gear 5a which is fixed to a shaft 6. As shown, the shaft 6 is common to all of the sets of rolls 3a and is provided with a plurality of worm gears 5a each in mesh with the worm 5 on the lower shaft for the adjacent set of rolls. The shaft 6 is drivingly connected to the shaft of a suitable motor 7, supplied with current from a suitable source, to feed the material and formed member 1a relative to the electrodes 8, 8a, of a suitable welding machine mechanism indicated as an entirety at 9. As will be understood, the sets of rolls 3a are preferably utilized to uncoil the stock from the coil 1 and feed the stock and formed member 1a to and through the mechanisms, 3, 9, and cooling means 13. While the supply of current to the motor 7 may be manually controlled, I provide means for automatically controlling such supply as later set forth herein. The welding mechanism 9 may be of any desired form and construction, but preferably is of the electrical resistance type and may be similar in construction and operation to the mechanism shown in Letters Patent No. 2,283,941 to Howard I. Morris, consisting of the electrodes 8, 8a, (which are rotatable) related to pressure rolls 9a, which may be driven, guide rolls 9b, 9c and a seam guide. The electrodes are supplied with electrical energy through conductors 8b, 8c, to which they are electrically connected. 10 indicates a rod fixed at its outer end to a suitable stationary support 10a (fixedly mounted in any desired manner) which extends into the member 1a, through the open seam thereof, in advance of the last set of shaping rolls 3a. The inner end of the rod is provided with a suitable tool 11, for removing the welding burr on the inner wall of the member 1a. 11a indicates a tool which may be supported in any suitable manner, for removing the welding burr on the exterior wall of the member 1a. 12 indicates a housing enclosing the welding mechanism 9 and related to the flooring 2c to form a chamber 12b.

The housing 12 is provided with an inlet or supply pipe 12a leading from a suitable source of inert gas supply, under pressure, (such as nitrogen or a mixture of nitrogen and hydrogen or hydro-carbonic gas), for filling the chamber 12b with a non-oxidizing or reducing gas atmosphere to prevent oxidation of the seam edges and surface of the member 1a. The step of effecting welding in an inert gas atmosphere is advantageous where the use of the complete tube sections 1b (see Fig. 1a) does not require external treatment, such as polishing or grinding.

In the form of construction shown in Figs. 1 and 1a, I provide adjacent to and in alinement with the welding mechanism 9, means, indicated as an entirety at 13, for cooling the welded seam. The cooling means 13 consists of an elongated pipe 13a related above and longitudinally of the member 1a in alinement with the seam thereof and formed on its lower side with a plurality of openings, one end of the pipe being connected with a supply pipe 13b leading from a source of liquid coolant supply (such as water), under pressure, whereby the coolant is supplied to the pipe 13a and sprayed on the welded seam.

A suitable collector (not shown) may be provided below the member 1a to receive the cooling medium, the collector in turn being connected to a drain or sump. When desired, the cooling means 13 may be omitted.

It will be observed that to insure a uniform and efficient welding of the seam edges 1x (Fig. 1b) throughout the contiguous portions of the member 1a, a substantially predetermined relation between the heat energy supplied to the seam edges 1x and the speed of movement of the member 1a must be maintained. To maintain this relation I provide control means, indicated as an entirety at 14 (see Fig. 2) dependent on the variation of the temperature of the fused metal of the seam edges due to heating thereof, for (a) automatically varying the speed of the stock and member 1a due to the driving of the sets of rolls 3a by the motor 7, whereby the speed of the member 1a is increased or slowed down in the event the temperature of the fused metal varies or (b) through electronic devices, indicated as an entirety at 14x, as shown in Fig. 3, automatically controlling the supply of electrical energy to the electrodes 8, 8a. The metal of the seam edges when heated to the welding or fusion temperature emits red colored waves and if the temperature of the metal rises the color reverts first to orange and then to yellow; if the temperature of the metal drops the color reverts to infra-red. Accordingly, by directing these waves upon a photoelectric cell the operation of which reacts to light waves (technically termed photoelectric emission) through that portion of the spectrum having the longest wave lengths, that is, yellow, orange red and infra-red, and utilizing the variation in frequency of these color waves to increase or decrease the velocity of expulsion of the electrons emitted by the cathode of the cell, the motor 7 or the supply of electrical energy may be automatically controlled, as later set forth.

The control means 14 comprise the following: 15 indicates a fused quartz rod the inner end of which is disposed immediately adjacent to the point of welding, below the electrodes 8, 8a. The outer end of the fused quartz rod is related to the window of a photo-electric cell 16 (preferably of the gas-filled type), the rod 15 serving to convey the color emitted or produced by the fused metal to the cell 16. The cell consists of an anode 16a connected by a lead 16b through a suspended coil 17 of a galvanometer 17a and an adjustable resistance 18 connected to one side of battery 19, and a cathode 20 formed of caesium, sodium or potassium, connected by a lead 20a to the opposite side of the battery 19. The galvanometer preferably consists of a permanent magnet, the poles of which provide a uniform magnetic field between them, and the suspended coil 17, which is provided with a rod 21 carrying at its opposite ends contacts 22, 22a, arranged to alternately engage contacts 23, 23a, respectively, and close one of the circuits 24, 24a, later referred to. As will be understood, the coil 17 and contacts 22, 22a, on the rod 21 are insulated therefrom and each other.

25, 25a, 25b indicate A. C. supply mains connected through normally open switches 25c, 25d, 25e, respectively, to a motor 26, whereby upon closing of the switches the motor 26 is driven in one direction. 27, 27a, 27b, indicate branch leads leading from the mains 25, 25a, 25b, respectively, and connected through normally open switches 27c, 27d, 27e, respectively, to the supply mains 25, 25a, 25b, between the switches 25c, 25d, 25e, and the motor 26; that is, branch lead 27 is connected to the main 25 and branch lead 27a is connected to the main 25a and branch lead 27b is connected to the main 25b, so that when the switches 27c, 27d, 27e, are closed, the motor 26 will be driven in the opposite direction. The movable contacts for the switches 25c, 25d, 25e, and 27c, 27d, 27e, are connected by rods 28, 28a, respectively, to the opposite ends of a rocker 29, which is normally held in neutral position by springs 29a, to maintain all of the switches open. The opposite end portions of the rocker 29 are related to and form the armatures for relays 30, 30a, the coils of which are series connected in the circuits 24, 24a, respectively, so that when the suspended coil 17 of the galvanometer 17a is operated in either direction, one of the circuits 24, 24a, is closed and the coil of one of the relays is energized, the effect of which is to rock the lever 29 and close the circuit through the adjacent switches to the motor 26. The circuit 24 is traced as follows: lead 25b, lead 31, coil of relay 30, lead 31a, contact 23, contact 22 and lead 31b to lead 27a. The circuit 24a is traced as follows: lead 25b, lead 31, lead 31c, coil of relay 30a, lead 31x, contact 23a, contact 22a, lead 22b, and lead 31b to lead 27a.

32 indicates a dial type of potentiometer having a revoluble arm 32a, the shaft 32b therefor being drivingly connected to the shaft of the motor 26, whereby the latter swings the arm 32a in one direction or the other according to the direction of rotation of the motor (this driving connection including suitable reduction gearing and being of any well known form, but shown diagrammatically in Fig. 2).

One end of the potentiometer 32 is connected by a lead 33 to one supply main 33x, whereas the arm 32a is connected by a lead 33a to one side of the motor 7 (field coil thereof), which in this arrangement is of the D. C. type. The other side of the motor is connected by a lead to the other supply main 33b. As will be understood the revolution of the arm 32a increases or decreases the resistance in the motor circuit the effect of which is to rapidly change the speed of the motor 7 (increase or decrease its speed), dependent upon the direction of movement of the arm 32a, to insure immediate response to the change in the color of the fused metal at the point of weld.

It will be observed that the resistance 18 is adjusted to balance or off-set the E. M. F. of the cell 16, so that during the welding operation so long as the emitted light waves are red, the current induced by the cell through the circuit will be of too low a voltage to effect a torque movement on the coil 17, but sufficient to balance the voltage from the battery 19. However if the supply of electrical energy to the electrodes 8, 8a, drops, so that the temperature of the fused metal is reduced the emitted red color reverts to infrared, which having a frequency below that of the color red, lowers the velocity of expulsion of the electrons fired by or discharged from the cathode 20, thereby ionizing the gas in the cell, which in turn produces a current from the battery in one direction to the coil 17 through lead 16b and affecting the relation between the resistance 18 and battery 19, so that the latter supplies current in one direction through the coil 17 to effect torque movement thereof to swing the arm 21 in one direction and closes one of the circuits 24, 24a, for example, circuit 24. The closed circuit in turn supplies current to the motor 26, in the manner already set forth, to swing the potentiometer arm 32a clockwise, as viewed in Fig. 2, whereby supply of current to the motor 7 is increased to thereby decrease the speed of movement of the stock and member 1a relative to the welding electrodes 8, 8a. By decreasing the speed of the member 1a the contiguous portions thereof will be related to the welding zone long enough to be heated to the desired fusing temperature. On the other hand, if the temperature of the fused metal during welding is elevated above the temperature at which red color waves are emitted, the color emitted thereby reverts to orange, the frequency of which is higher than red and accordingly such frequency will increase the velocity of expulsion of the electrons fired or discharged from the cathode 20; as a result, current from the battery 19 will flow in the opposite direction through the suspended coil 17, which will operate to close the other circuit 24a, whereby current is supplied to the motor 26 to swing the arm 32a counter-clockwise (as viewed in Fig. 2), whereby the supply of current to the field of the motor 7 is decreased to speed up the movement of the stock and member 1a relative to the electrodes 8, 8a, and thus reduce the period of time that the contiguous portions of the member 1a are subjected to the electrical energy to be heated thereby. It will be observed following the reduction of speed of the member 1a or increase of speed thereof, when the relationship between the supplied electric energy and speed of the member becomes normal, so that red color waves are emitted by the fused metal, flow of current from the battery 19 or cell 16 through the coil is balanced out and the latter returns to normal position between the magnet poles.

Fig. 3 illustrates a modified form of construction wherein automatic operation of the motor 26, instead of varying the speed of the motor 7, actuates a potentiometer 49, which through an electronic system, controls the electric energy supplied to the electrodes 8, 8a, for welding the seam edges 1x of the hollow member 1a; in this form of construction the speed of the motor 7 and movement of the member 1a relative to the welding electrodes remains constant. As illustrated in this view alternating current is supplied from a suitable source by supply mains 35, 35a, lead 35 being connected through a pair of ignitrons 36, 36a, in anti-parallel to one side of the primary 37 of the welding transformer 38; the other side of the primary is connected to the input main 35a. The secondary 37a of the welding transformer 38 is connected across the electrodes 8, 8a, in engagement with the work as already set forth. Each of the ignitrons includes an anode 36b, a mercury pool cathode 36c and an igniter 39 in contact with the cathode. The lead 35a is connected by lead 40 to one side of an auto-transformer 41, whereas the lead 35 is connected by lead 40a to the other side of the auto-transformer 41 through taps.

A pair of thyratron tubes are shown at 42, 42a, preferably of the gas-charged type, each having a filament (cathode) 43 and a plate (anode) 44. 45 indicates a transformer, the primary winding of which is connected by lead 45a to the secondary winding of the auto-transformer 41 and by a lead 45b to the lead 40, an adjustable resistance 45x being provided in the lead 45b. One secondary winding 61 of the transformer 45 is connected by lead 45c to one end of the filament 43 of the tube 42a, the other end thereof being connected by leads 45d, 45e, 45f, to the plate 44 of the tube 42. The other secondary winding 61a of the transformer 45 is connected by lead 66 to one end of the filament 43 of the tube 42, the other end thereof being connected by leads 62, 63, 64, to the plate 44 of the tube 42a.

The potentiometer 49 is formed in separate related sections 49a, 49b, each connected in series in leads, as later set forth, and arranged to be engaged by the oppositely disposed arcuate elements 32c, 32d, on the arm 32a, which is also a conductor, so that when the arm 32a is revolved by the motor 26 (as already set forth) in either direction the resistance in both potentiometer sections are simultaneously cut-out (decreased) or cut-in (increased), the effect of which is to control the electronic circuit, dependent upon the direction of movement of the arm 32a, to insure immediate response to the change in color of the fused metal at the point of weld.

46, 47 indicate grid transformers, corresponding ends of the primary windings thereof being connected by a lead 48 to the secondary winding of the auto-transformer 41 and their other ends being connected by lead 47x to the opposite ends of the potentiometer section 49b. One end of the secondary winding of the transformer 47 is connected by a lead 50, through a resistance 50a to the grid 51 of the tube 42a, whereas the other end of the secondary winding is connected by a lead 52 to the lead 45d and by lead 52a to the shield grid 51a of the tube 42a. 53 indicates a capacitor between the leads 50 and 52. The secondary winding of the transformer 46 is connected to the grid 51 and shield grid 51a of the tube 42 similar to that above described with respect to the secondary winding of the transformer 47.

Ignitrons 36 and 36a are each half wave conducting electronic devices and therefore must be connected in inverse parallel (as already set forth) to obtain full wave impulses at the weld point. Each of the ignitrons 36 and 36a will fire only when the potential in the circuit to ignitor 39 thereof is sufficient to form a cathode in its mercury pool.

For control of the ignitrons 36 and 36a a peak bias voltage circuit on two thyratron tubes 42, 42a, is used wherein the bias voltage may be varied by the potentiometer sections 49a, 49b, to impede the current in the grid circuits 51, 46, 47, 50, 50a, and 52 and thereby determine when either ignitron should fire and over how long a period.

Copper oxide rectifiers 54, 54a, are required in circuits of ignitrons 36, 36a, respectively, to prevent damaging reverse current flow from the mercury pools to the ignitors and also reduce the possibility of a transient potential of sufficient strength in either circuit to escape and fire the other tube.

Time relays 57, 57a, are used in the grid circuits to avoid using the circuit until filament 43 in either tube 42, 42a, has reached its operating heat.

A multi-tap transformer 58, which is connected by lead 47a to potentiometer section 49a, is used so that a balancing adjustment of the grid and filament circuits can be effected conveniently. The secondary of the multi-tap transformer 58 is used for a vernier voltage control in the grid and filament or cathode circuits.

When time relays 57, 57a, have passed their period of control the contact 57x in the circuit 45d to the tube 42a is closed and the circuit is set up for operation; thereupon contact 57b may be closed to effect welding.

Assuming that a positive portion of a 60 cycle wave is entering through main 35a, it is impressed on the plate 36b of tube 36 and passes through rectifier 54a; however at this instant plate 36b of tube 36a is negative and therefore cannot fire and a positive wave flows through closed contacts 57x and 57b to conductors 45e, 45f, and into plate 44 of tube 42, but this tube cannot fire at the exact moment that the positive wave potential is impressed on the plate unless the grid 51 is positive and the period at which the grid goes positive is determined by the impedance of the grid circuit which is changed by the adjustment of potentiometers 49a and 49b, due to the rotation of the arm 32a. At the same instant that the positive wave starts through main 35a and the circuit just described, it also passes through lead 40 to the grid and cathode circuits which may be traced as follows: 65, 65a, 65b, 65c, resistance 45x and primary winding 45, secondary winding 61a, and conductor 66; then starting again 65, through 65a, 65b, balancing potentiometer 60, adjustable potentiometer plate 49a, arm 32a and section 49b through grid transformer 46 and into grid 51a.

At this point the positive wave meets in all elements of the tube 42, such as the plate 44, the grid 51a and the cathode filament 43, but because of the difference in the impedance of the grid circuit just described and the cathode filament circuit also described, the period of firing is controlled over all or only a small portion of the wave time up to one half of its duration.

If adjustments of the potentiometer 49 are such that the impedance of the grid and cathode-filament circuits are very small then the positive wave will flow almost in its entirety through tube 42, the lag being the normal impedance of the tube 42, and the positive wave will go on through conductors 62, 67, 67a, normally closed overload switch 75, fuse 76, rectifier 54, resistor 55, ignitor 39 in tube 36 and allow the positive wave to pass from plate 36b in tube 36 into mercury pool 36c now turned cathode, back to 35 to complete the circuit and allow a half wave of 60 cycle current to pass through the main transformer primary winding 37 and secondary winding 37a to the electrodes 8, 8a.

It will be noted that this entire cycle will be duplicated through ignitron tube 36a and thyratron tube 42a when the second half of a 60 cycle wave starts through supply main 35 to complete the circuit to 35a.

By this method of control minute or large changes in the primary and secondary current of the main transformer 37, 37a, can be initiated by the adjustments in the potentiometer sections 49a, 49b, and automatic control quickly results due to color change in the weld at the weld point so that a continuous weld may be performed without depending upon the dexterity or efficiency of an operator once an approximate setup has been made.

In operation the quartz rod 15 transmits light from the weld glow to the photo tube 16 which is tuned for light waves of the required frequency depending upon the type of material being welded. For alloys containing nickel or chrome a higher frequency is required than on steels containing manganese and still lower frequency is required for plain carbon grades of steel.

Some of this adjustment can be obtained by potentiometer 18 by varying the potential from battery 19 to balance the potential from photocell 16.

The light waves strike cathode 20 and electrons are emitted allowing current from battery 19 to pass through the tube and into galvanometer coil 17 which is balanced in a predetermined position with respect to contacts 23 and 23a on jewel bearings (not shown), through the permanent magnets N and S thereof.

As the light waves increase in wave length (lower frequency) due to lack of current passing into electrodes 2, 8a, and reducing the energy expended in the weld the permanent magnets become stronger than the potential being supplied by photo tube 18 and battery 19, the galvanometer core 17 is deflected and contacts 22, 23, close allowing current to flow to coil 30 and close contacts 27c, 27d, 27e, allowing current to flow in lines 27, 27a, 27b, to motor 26 for driving the latter in one direction.

If the wave length of the light being emitted by the weld decreases in wave length (higher frequency) a greater emission of electrons will result in increasing the flow of current through tube 18 from battery 19 and through galvanometer core 17, overcoming the influence of the permanent magnets N, S, and allowing the core 17 to deflect to close contacts 22a, 23a, thereby allowing current to flow through coil 30a and close contacts 25c, 25d, 25e, feed the motor 26 through lines 25, 25a, 25b, for reverse rotation and change the setting on the potentiometer sections 49a, 49b.

The photo cell may be operated, as indicated above, in a range of 6000 to 7000 Angstrom units for light wave length or opposite results may be obtained by operating the cell on light wave lengths from 7500 to 9000 Angstrom units. The range to be covered will depend upon the use of a suitable filter provided between the quartz transmission tube and the cathode of the photo cell. The filter can easily be calibrated before use, so that the method of wiring the circuit can be predetermined.

From the foregoing description it will be observed that the electrical energy is controlled per unit length of the member 1a, either by increasing or decreasing the endwise speed thereof or where the speed of the member is constant by regulating the supply of the electrical energy to the electrodes.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

In electrical welding apparatus in which a welding transformer energized from an alternating current supply circuit adapted to supply alternating current to heat an article to be welded, the combination of a pair of gaseous discharge rectifiers connected in reverse directions in said supply circuit, said rectifiers normally being inactive and having starting electrodes, a pair of thermionic tubes connected to energize the starting electrodes of said rectifiers and each tube having a control grid, circuits for supplying control voltages to the grids of said tube from said alternating current supply circuit, means including a potentiometer having a movable contact for varying the value and phase of said control voltages to control the duration of the period of operation of said rectifiers in each cycle of said source, whereby the current supplied to said transformer may be increased or decreased, a reversible motor for operating the movable contact on said potentiometer in either direction, a photoelectric cell adapted to respond to the heat condition of said article, and means controlled by said cell for operating said motor in a direction to decrease the current supplied to said transformer when the temperature of said article increases above a predetermined value and for operating said motor in the opposite direction to increase the current supplied to said transformer when the temperature decreases beyond a predetermined value.

GEORGE E. KENTIS, Jr.

REFERENCES CITED

The following references are of record in the file of this patent:

UNITED STATES PATENTS

| Number | Name | Date |
|---|---|---|
| 1,961,256 | Spire | June 5, 1934 |
| 2,089,014 | Bucknam et al. | Aug. 3, 1937 |
| 2,089,015 | Bucknam et al. | Aug. 3, 1937 |
| 2,089,029 | Jones | Aug. 3, 1937 |
| 2,215,576 | Bucknam et al. | Sept. 24, 1940 |
| 2,268,498 | Bryce | Dec. 30, 1941 |